(12) United States Patent
Lin

(10) Patent No.: US 8,593,500 B2
(45) Date of Patent: Nov. 26, 2013

(54) VIDEO CONFERENCE DEVICE AND METHOD FOR USING THE SAME

(75) Inventor: Jin-Hue Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 197 days.

(21) Appl. No.: 13/116,003

(22) Filed: May 26, 2011

(65) Prior Publication Data

US 2012/0242775 A1  Sep. 27, 2012

(30) Foreign Application Priority Data

Mar. 25, 2011  (CN) .......................... 2011 1 0073821

(51) Int. Cl.
*H04N 7/14* (2006.01)
(52) U.S. Cl.
USPC ...................................... 348/14.01
(58) Field of Classification Search
None
See application file for complete search history.

(56) References Cited

U.S. PATENT DOCUMENTS

| | | | |
|---|---|---|---|
| 6,847,618 B2 * | 1/2005 | Laursen et al. | 370/261 |
| 2009/0320073 A1 * | 12/2009 | Reisman | 725/51 |
| 2012/0026278 A1 * | 2/2012 | Goodman et al. | 348/14.08 |

* cited by examiner

*Primary Examiner* — Duc Nguyen
*Assistant Examiner* — Theodore Ndje
(74) *Attorney, Agent, or Firm* — Altis Law Group, Inc.

(57) ABSTRACT

A video conference (VC) device for communicating with VC terminals includes a VC box and a set-top box (STB). The VC box includes a VC controller module, a media stream receiver module, and a decoder module. When a session is established between one of the VC terminals and the VC box, the VC controller detects if the decoder module is available. When the decoder module is available, the media stream receiver module receives a media stream sent from the VC terminal and transmits the media stream to the decoder module, and the decoder module processes the media stream to generate corresponding video and audio signals for the session. When the decoder module is unavailable, the media stream receiver module transmits the media stream to the STB, and the STB processes the media stream to generate corresponding video and audio signals for the session.

13 Claims, 8 Drawing Sheets

VIDEO CONFERENCE DEVICE AND METHOD FOR USING THE SAME

BACKGROUND

1. Technical Field

The present disclosure relates to network communication, and particularly to a video conference device and a method for using the video conference device.

2. Description of Related Art

In video conferences, video and audio data generated in communication between conference participants needs to be quickly processed by an electronic processor, such that the conference participants can easily communicate with each other. However, when a great number of participants participate in a video conference, a large quantity of video and audio data is generated in communication between these participants. The processor of the video conference, due to limitations of its hardware conditions, may not be able to satisfactorily process the large quantity of video and audio data.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

DETAILED DESCRIPTION

Figure 1:
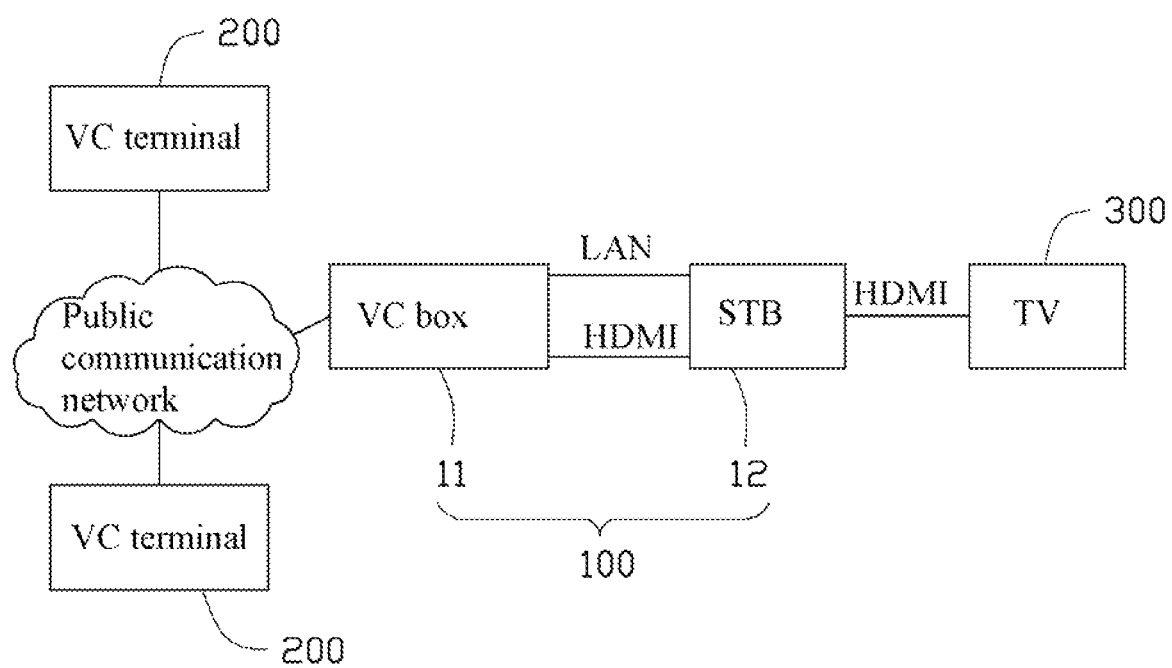
FIG. 1 is a block diagram of an exemplary embodiment of a video conference (VC) device, which is connected with a public communication network and a television.

FIG. 1 shows a video conference (VC) device 100, according to an exemplary embodiment. The VC device 100 includes a VC box 11 and a set-top box (STB) 12. The VC box 11 and the STB 12 are connected to each other through both a local area network (LAN) connection and a high definition multimedia interface (HDMI) connection. In this embodiment, the LAN connection can be an Ethernet connection. In other embodiments, the HDMI connection can be replaced by a DisplayPort (DP) interface connection.

The VC box 11 can synchronously communicate with a plurality of VC terminals 200 through a public communication network, such as the Internet. The plurality of VC terminals 200 can establish a VC using the public communication network and the VC box 11. The STB 12 is connected to a television (TV) 300 through an HDMI connection or a DP interface connection. In this embodiment, the VC terminals 200 can be personal computers (PC) or video phones. Also, the STB 12 can be integrated with common TV systems, such as an Internet Protocol TV (IPTV).

Figure 2:
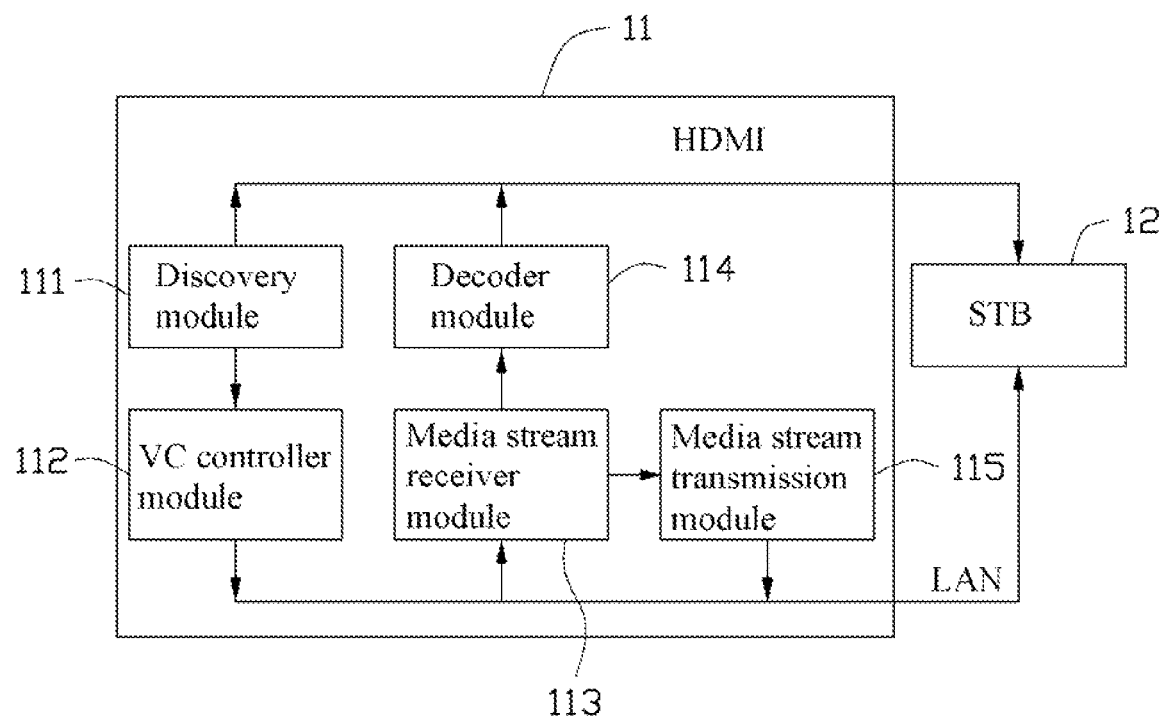
FIG. 2 is a block diagram of a VC box of the VC device of FIG. 1, showing connection of the VC box to a set top box (STB) of the VC device.

Also referring to FIG. 2, the VC box 11 includes a discovery module 111, a VC controller module 112, a media stream receiver module 113, a decoder module 114, and a media stream transmission module 115. In general, the word "module," as used herein, refers to logic embodied in hardware or firmware, or to a collection of software instructions, written in a programming language, such as, Java, C, or Assembly. One or more software instructions in the modules may be embedded in firmware, such as erasable-programmable read-only memory (EPROM). The modules described herein may be implemented as either software and/or hardware modules and may be stored in any type of computer-readable medium or other storage device.

Both the discovery module 111 and the decoder module 114 are connected to the STB 12 through the above-described HDMI connection or DP interface connection. The VC controller module 112, the media stream receiver module 113, and the media stream transmission module 115 are all connected to the STB 12 through the above-described LAN connection. The discovery module 111 can detect relative parameters of the STB 12 connected to the VC box 11 using predetermined communication protocols, such as consumer electronic control protocol (CECP) or simple service discovery protocol (SSDP). In this embodiment, the discovery module 111 identifies type parameters of the STB 12 (e.g., kind of STB, serial number, and manufacturer) using CECP, and identifies working parameters of the STB 12 (e.g., the number of available media decoders, media mode, and chroma key) using SSDP.

Each of the VC terminals 200 can request the VC box 11 to establish a session between the VC terminal 200 and the VC box 11 using predetermined communication protocols, such as session initiation protocol (SIP) or session description protocol (SDP). When the VC box 11 receives a request for establishing a session from one of the VC terminals 200, the VC controller module 112 detects if the decoder module 114 can normally process data generated in the session established between the VC box 11 and the VC terminal 200. If the decoder module 114 can normally process the data, the VC controller module 112 controls the media stream receiver module 113 to receive a media stream sent from the VC terminal 200 and transmit the media stream to the decoder module 114. The decoder module 114 processes the media stream to generate corresponding video and/or audio signals for the session. If the decoder module 114 is unable to normally process the data (e.g., when the decoder module 114 malfunctions or is busy), and the discovery module 111 has identified that there is at least one available media decoder in the STB 12, the VC controller module 112 controls the media stream receiver module 113 to receive the media stream sent from the VC terminal 200 and transmit the media stream to the STB 12 through the media stream transmission module 115. The STB 12 processes the media stream to generate corresponding video and/or audio signals for the session.

In this embodiment, the VC controller module 112 generates a stream forward table corresponding to the media stream and sends the stream forward table to the media stream receiver module 113 to inform the media stream receiver module 113 whether the decoder module 114 is available. In particular, if the decoder module 114 is available, the VC controller module 112 does not fill any data into the stream forward table. Upon receiving the blank stream forward table, the media stream receiver module 113 identifies that the decoder module 114 is available and transmits the media stream to the decoder module 114. If the decoder module 14 is unavailable and the STB 12 has at least one available media encoder, the VC controller module 112 fills transmission information corresponding to the media stream into the stream forward table. The transmission information includes relevant transmission parameters of the media stream, such as a local real-time transport protocol (RTP) port number of the media stream, and an Internet Protocol (IP) address and an RTP port number of a transmission destination of the media stream. Upon receiving the stream forward table filled with the transmission information, the media stream receiver module 113 identifies that the decoder module 114 is unavailable, and transmits the media stream to the STB 12 through the media stream transmission module 115.

Figure 3:
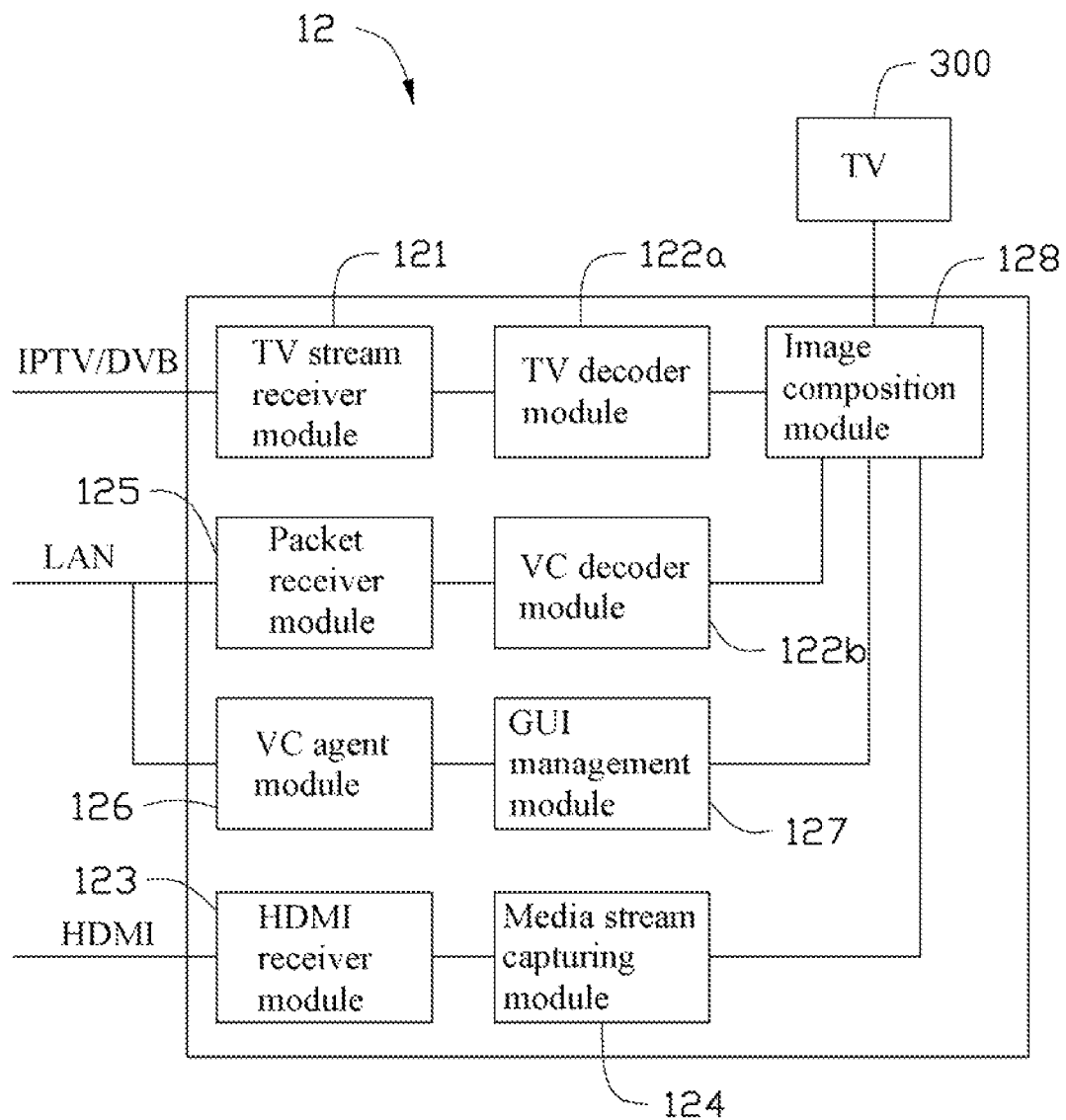
FIG. 3 is a block diagram of the set top box (STB) of the VC device of FIG. 1, showing connection of the STB to the television.

Also referring to FIG. 3, the STB 12 includes a TV stream receiver module 121, a TV decoder module 122a, at least one VC decoder module 122b, an HDMI receiver module 123, a media stream capturing module 124, a packet receiver module 125, a VC agent module 126, a graphical user interface (GUI) management module 127, and an image composition module 128.

The TV stream receiver module 121 can be a typical TV stream receiver. The TV stream receiver module 121 is used to receive common IPTV signals or digital video broadcasting (DVB) signals. The TV decoder module 122a is electrically connected between the TV stream receiver module 121 and the image composition module 128. The TV decoder module 122a can be a typical TV decoder. In use, the TV decoder module 122a decodes the IPTV signals or DVB signals received by the TV stream receiver module 121 to generate corresponding video and audio signals (i.e., common TV signals), and provides the decoded video and audio signals to the image composition module 128.

The HDMI receiver module 123 is connected to the decoder module 114 through the above-described HDMI connection or DP interface connection. The media stream capturing module 124 is electrically connected between the HDMI receiver module 123 and the image composition module 128. When the decoder module 114 decodes a media stream sent from the media stream receiver module 113 and generates corresponding video and audio signals, the video and audio signals can be transmitted to the HDMI receiver module 123 through the HDMI connection or DP interface connection. The media stream capturing module 124 can capture the video and audio signals, and transmit the captured video and audio signals to the image composition module 128.

The packet receiver module 125 and the VC agent module 126 are both connected to the media stream transmission module 115 through the above-described LAN connection. The VC decoder module 122b is electrically connected between the packet receiver module 125 and the processor 128. When the media stream receiver module 113 transmits a media stream to the STB 12 through the media stream transmission module 115, the packet receiver module 125 receives packets of the media stream from the media stream transmission module 115. The VC decoder module 122b decodes the packets of the media stream to generate corresponding video and audio signals, and transmits the video and audio signals to the image composition module 128. The GUI management module 127 is electrically connected between the VC agent module 126 and the processor 128. The VC agent module 126 can receive GUI data of the VC box 11, such as options and reference information for operating the VC box 11. The GUI management module 127 transmits the GUI data of the VC box 11 to the image composition module 128.

Figure 4:
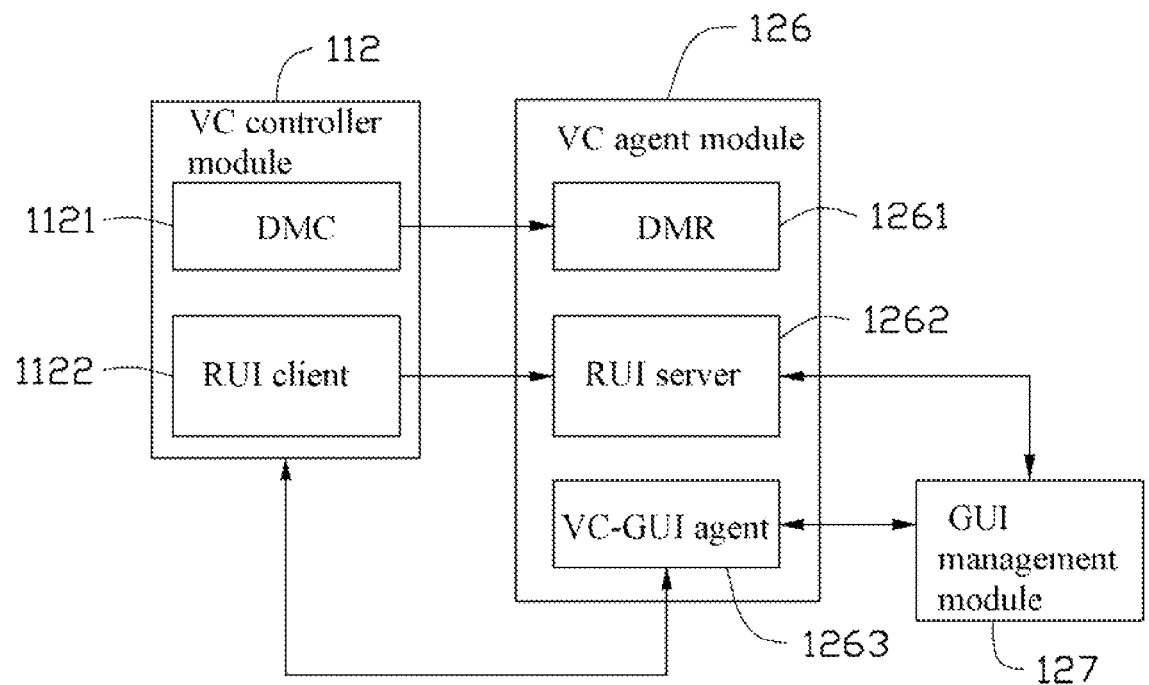
FIG. 4 is a block diagram of a VC controller module of the VC box of FIG. 2, in connection to a VC agent module and a graphical user interface (GUI) management module of the STB of FIG. 3.

Also referring to FIG. 4, the VC agent module 126 is further connected to the VC controller module 112 through the above-described LAN connection to detect the GUI of the VC box 11. In this embodiment, the VC controller module 112 includes a digital media controller (DMC) 1121 and a remote user interface (RUI) client 1122. The VC agent module 126 includes a digital media render (DMR) 1261, an RUI server 1262, and a VC-GUI agent 1263. When the VC controller module 112 begins to fill transmission information corresponding to a media stream into a stream forward table, the DMC 1121 sends reminder information to the DMR 1261 to remind the DMR 1261 that packets of the media stream will be transmitted to the STB 12 to be processed. The RUI client 1122 transmits the GUI data of the VC box 11 to the GUI management module 127 through the RUI server 1262.

The VC controller module 112 can register windows in the GUI management module 127 through the VC-GUI agent 1263, wherein the windows are used to display the GUI data of the VC controller module 112 and images corresponding to media streams processed by the STB 12. In this embodiment, a property of the windows registered by the VC controller module 112 is set to be top-Zorder, and a chroma key of the windows registered by the VC controller module 112 is set to be transparent. Furthermore, the VC-GUI agent 1263 can detect display positions of the windows registered by the VC controller module 112 on display devices (e.g., the TV 300) through the GUI management module 127.

The image composition module 128 is electrically connected to the TV decoder module 122a, the VC decoder module 122b, the media stream capturing module 124, and the GUI management module 127 as detailed above, and is further connected to the TV 300 through the above-described HDMI connection or DP interface connection. Video signals provided by the TV decoder module 122a, the VC decoder module 122b, and the media stream capturing module 124, and the GUI data of the VC box 11, are all received by the image composition module 128, as detailed above. Thus, the image composition module 128 can blend these video signals and the GUI data of the VC box 11 together to form multiple images, and transmit the multiple images to the TV 300 for display. The multiple images may include typical TV images, VC images sent from the VC terminals 200, and a GUI including options and reference information for operating the VC box 11. The image composition module 128 can determine overlapping orders of the typical TV images, the VC images sent from the VC terminals 200, and the GUI. Generally, the VC images overlap the typical TV images, and the GUI overlaps the VC images. The image composition module 128 can further scale the VC images and the GUI to predetermined display positions on the TV 300, and fill a default chroma key of the STB 12 into blank areas of the GUI.

Figure 5:
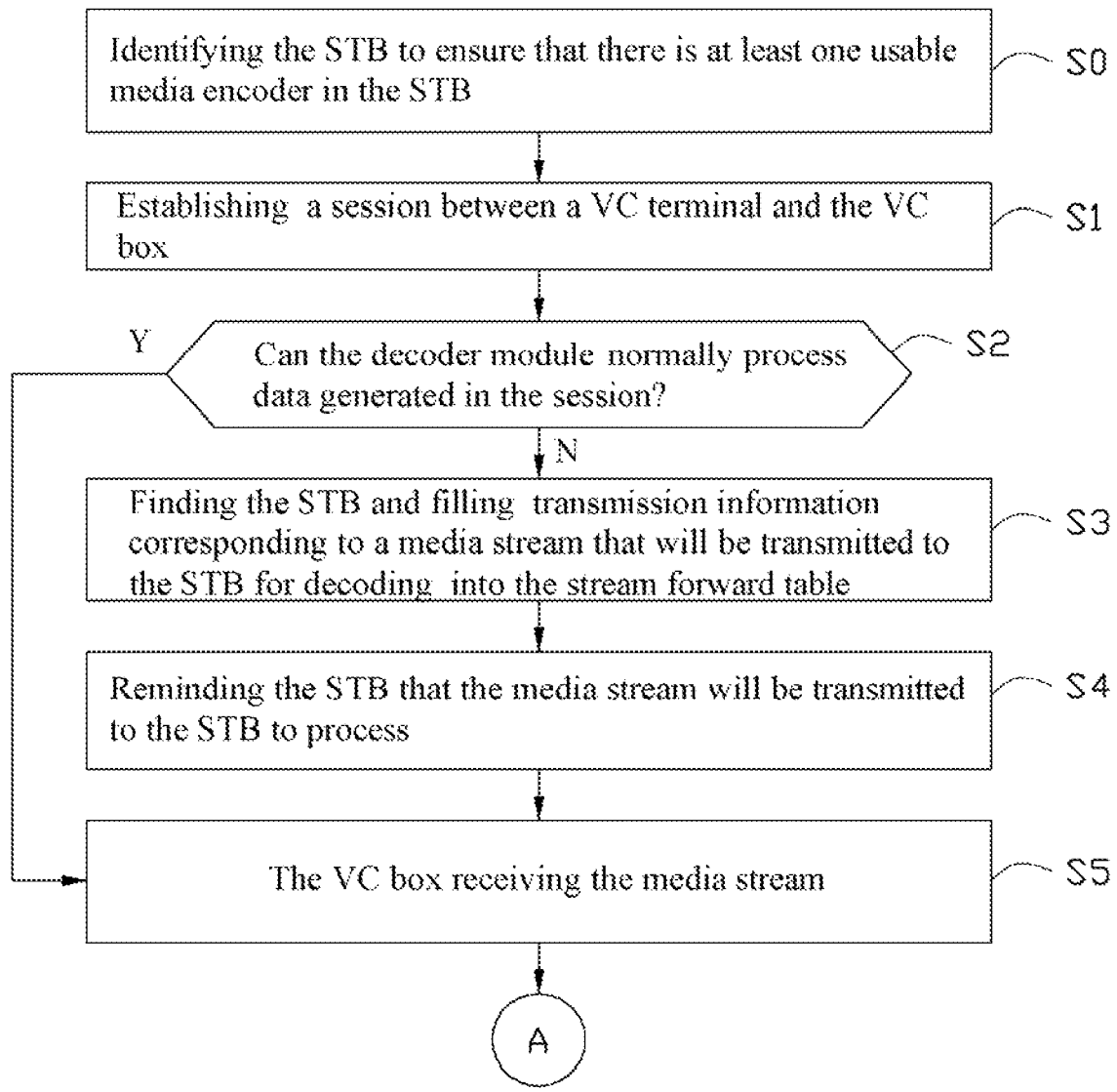
FIG. 5 is a flowchart of an exemplary method of using the VC device shown in FIG. 1 to establish communication between the VC box, the STB, and one VC terminal shown in FIG. 1.
Figure 6:
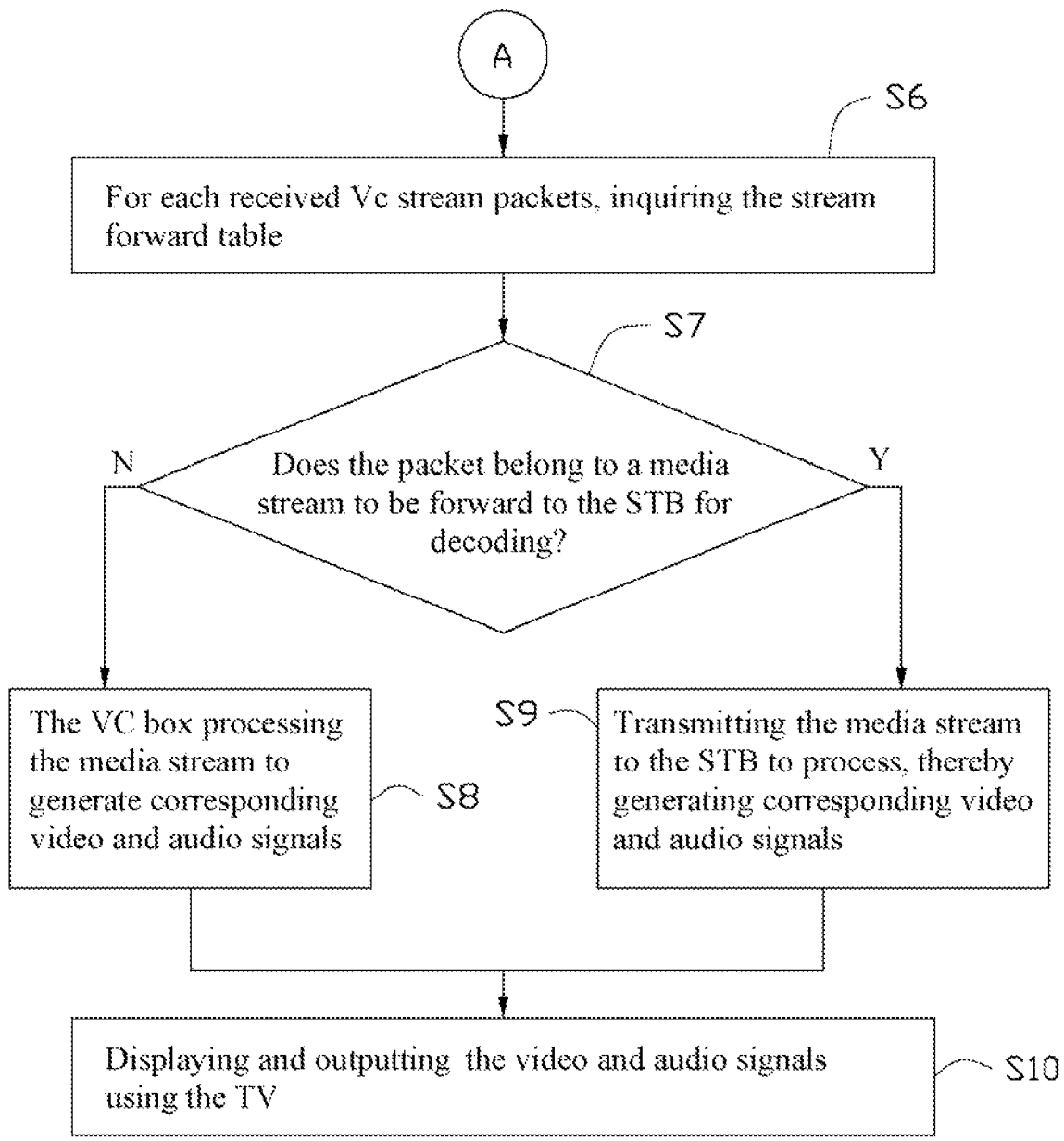
FIG. 6 is a continuation of FIG. 5, and is a flowchart of an exemplary method of using the STB shown in FIG. 1 to process video and audio data.

FIGS. 5-6 show flowcharts of a method for using the VC device 100. The method comprises steps as follows.

First, the discovery module 111 identifies type parameters of the STB 12 (e.g., kind of STB, serial number, and manufacturer) using CECP, and identifies working parameters of the STB 12 (e.g., the number of available media decoders, media mode, and chroma key) using SSDP, thereby ensuring that there is at least one available media encoder in the STB 12 (Step S0).

A session is established between one of the VC terminals 200 and the VC box 11 using predetermined communication protocols, such as SIP or SDP (Step S1).

When the session is established, the VC controller module 112 detects if the decoder module 114 can normally process data generated in the session established between the VC box 11 and the VC terminal 200 (i.e., determining whether the decoder module 114 of the VC box 11 is available for processing the data generated in the session), and generates a blank stream forward table according to the status of the decoder module 114 (Step S2).

If the decoder module 114 malfunctions or is busy, the decoder module 114 is unable to normally process the session data (i.e., is unavailable). In this situation, the VC controller module 112 finds the STB 12 associated with the VC box 11 and having at least one available media decoder, and fills transmission information corresponding to a media stream that will be transmitted from the VC terminal 200 to the STB 12 for decoding into the stream forward table (Step S3). The transmission information can include relevant transmission parameters of the media stream, such as an RTP port number of the media stream, and an IP address and an RTP port number of a transmission destination of the media stream. When the VC controller module 112 begins to fill the transmission information into the stream forward table, the DMC 1121 sends reminder information to the DMR 1261 to remind the DMR 1261 that packets of the media stream will be transmitted to the STB 12 to be processed (Step S4). In this embodiment, the DMC 1121 uses UPnP-DMC message as the reminder information to inform the DMR 1261 to start receiving and decoding the media stream. Thus, the VC controller module 112 sends the stream forward table filled with the transmission information to the media stream receiver module 113, and controls the media stream receiver module 113 to receive the media stream from the VC terminal 200 (Step S5).

If the decoder module 114 can normally process the session data (i.e., is available), the VC controller module 112 directly sends the blank stream forward table to the media stream receiver module 113 and controls the media stream receiver module 113 to receive the media stream from the VC terminal 200 (i.e., directly performing Step S5).

For each of received media stream packet, the media stream receiver module 113 inquires the stream forward table to identify if the stream forward table is filled with the transmission information (Step S6), and thereby further identifies if the received media stream packet belongs to a media stream that needs to be transmitted to the STB 12 for decoding (Step S7). If the stream forward table is blank, the media stream receiver module 113 identifies that the decoder module 114 is available and the packet does not belong to a media stream that needs to be transmitted to the STB 12 for decoding, and transmits the media stream to the decoder module 114 to be processed (Step S8). If the stream forward table includes the transmission information, the media stream receiver module 113 identifies that the decoder module 114 is unavailable and the packet belongs to a media stream that needs to be transmitted to the STB 12 for decoding, and transmits the media stream to the STB 12 through the media stream transmission module 115, thereby using the STB 12 to process the media stream (Step S9).

After either Step S8 or Step S9, the media stream sent from the VC terminal 200 is transformed into video and audio signals for a session, and thus a session is established between the VC terminal 200 and the VC box 11. In this way, a plurality of VC terminals 200 can synchronously establish sessions with the VC box 11. The VC device 100 can transmit the video and audio signals corresponding to media streams received from each of the VC terminals 200 to other VC terminals 200 by conventional means as would be known to those of ordinary skill in the art, such that these VC terminals 200 establish a VC through the VC device 100. Furthermore, when a plurality of media streams are sent to the VC box 11 from the VC terminals 200 and both the decoder module 114 and the STB 12 are available, the VC controller module 112 can select either the decoder module 114 or the STB 12 to process each of the media streams by means of maintaining the stream forward table of the media stream to be blank or filling the stream forward table of the media stream with corresponding transmission information. In this way, the VC controller module 112 can control the media stream receiver module 113 to transmit some of the media streams to the decoder module 114 and other of the media streams to the STB 12 to be processed, and thus the decoder module 114 and the STB 12 can be used substantially synchronously to process media streams sent from the VC terminals 200.

Figure 7:
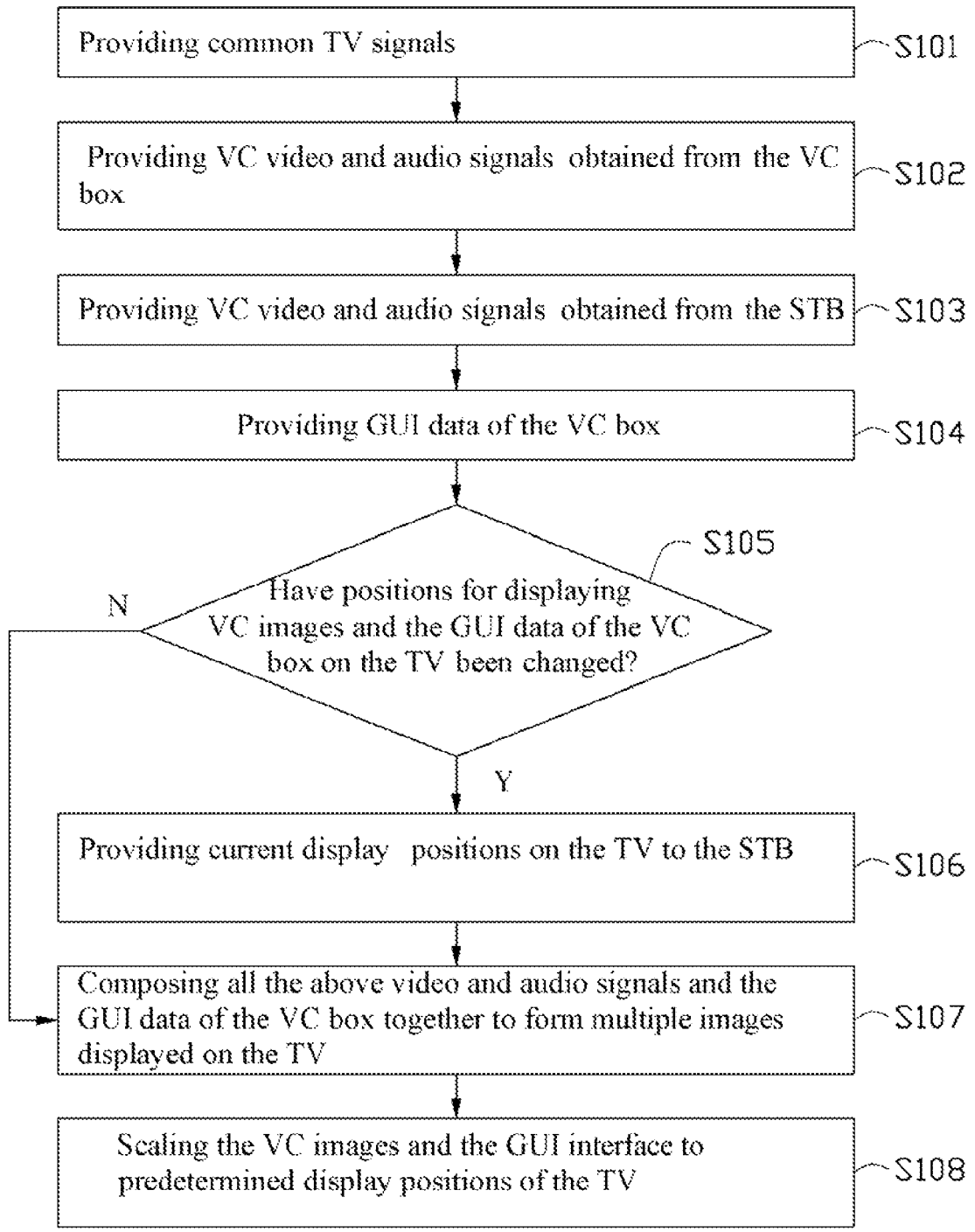
FIG. 7 is a flowchart of sub-steps of a step S10 shown in FIG. 6.

The STB 12 can also transmit the video and audio signals corresponding to media streams received from each of the VC terminals 200 to the TV 300, and thus the TV 300 can be used to display and output the video and audio signals, such that the VC of the VC terminals 200 is monitored using the TV 300 (Step S10). Also referring to FIG. 7, the above-described Step S9 includes sub-steps as follows.

In use, the TV stream receiver module 121 receives common IPTV signals or DVB signals from a typical TV. The TV decoder module 122*a* decodes the IPTV signals or DVB signals received by the TV stream receiver module 121 to generate corresponding video and audio signals (i.e., common TV signals), and provides the common TV signals to the image composition module 128 (Sub-step S101).

When the decoder module 114 decodes media streams sent from the VC terminals 200 and generates corresponding video and audio signals, the HDMI receiver module 123 receives the video and audio signals from the decoder module 114, and the media stream capturing module 124 captures the video and audio signals and transmits the captured video and audio signals to the image composition module 128 (Sub-step S102).

When the media stream receiver module 113 transmits media streams sent from the VC terminals 200 to the STB 12 through the media stream transmission module 115, the packet receiver module 125 receives the media streams from the media stream transmission module 115. The VC decoder module 122*b* decodes the media streams to generate corresponding video and audio signals, and transmits the video and audio signals to the image composition module 128 (Sub-step S103).

The RUI client 1122 transmits the GUI data of the VC box 11, such as options and reference information for operating the VC box 11, to the GUI management module 127 through the RUI server 1262. The GUI management module 127 further transmits the GUI data of the VC box 11 to the image composition module 128 (Sub-step S104).

The VC controller module 112 registers windows for displaying images on the TV 300 in the GUI management module 127 through the VC-GUI agent 1263, wherein the windows are used to display the GUI data of the VC box 11 and images corresponding to media streams processed by the STB 12. In this embodiment, the property of the windows registered by the VC controller module 112 is set to be top-Zorder, and the chroma key of the windows registered by the VC controller module 112 is set to be transparent. The VC-GUI agent 1263 further detects display positions of the windows on the TV 300 through the GUI management module 127, thereby identifying if the display positions of the windows have been changed by users of the TV 300 (Sub-step S105). If users of the TV 300 have changed the display positions of the windows, the VC-GUI agent 1263 provides current display positions of the windows to the image composition module 128 (Sub-step S106) before the image composition module 128 blends images. If the displaying positions of the windows have not been changed, the image composition module 128 can blend images according to previously recorded display positions of the windows, and thus the above-described Sub-step S106 is omitted.

Finally, video and audio signals provided by the TV decoder module 122a, the VC decoder module 122b, and the media stream capturing module 124, and the GUI data of the VC box 11, are all received by the image composition module 128, as detailed above. The image composition module 128 can blend these video and audio signals and the GUI data of the VC box 11 together to form multiple images and transmits the multiple images to the TV 300 for display (Sub-step S107), thereby providing monitoring of the VC of the VC terminals 200 at the same time as broadcasting common TV signals. The multiple images may include typical TV images, VC images sent from the VC terminals 200, and a GUI including options and reference information for operating the VC box 11. The image composition module 128 can determine overlapping orders of the typical TV images, the VC images sent from the VC terminals 200, and the GUI. Generally, the VC images overlap the typical TV images, and the GUI overlaps the VC images. The image composition module 128 can further scale the VC images and the GUI to predetermined display positions on the TV 300, and fill a default chroma key (e.g., transparent) of the STB 12 into blank areas of the GUI (Sub-step S108).

Figure 8:
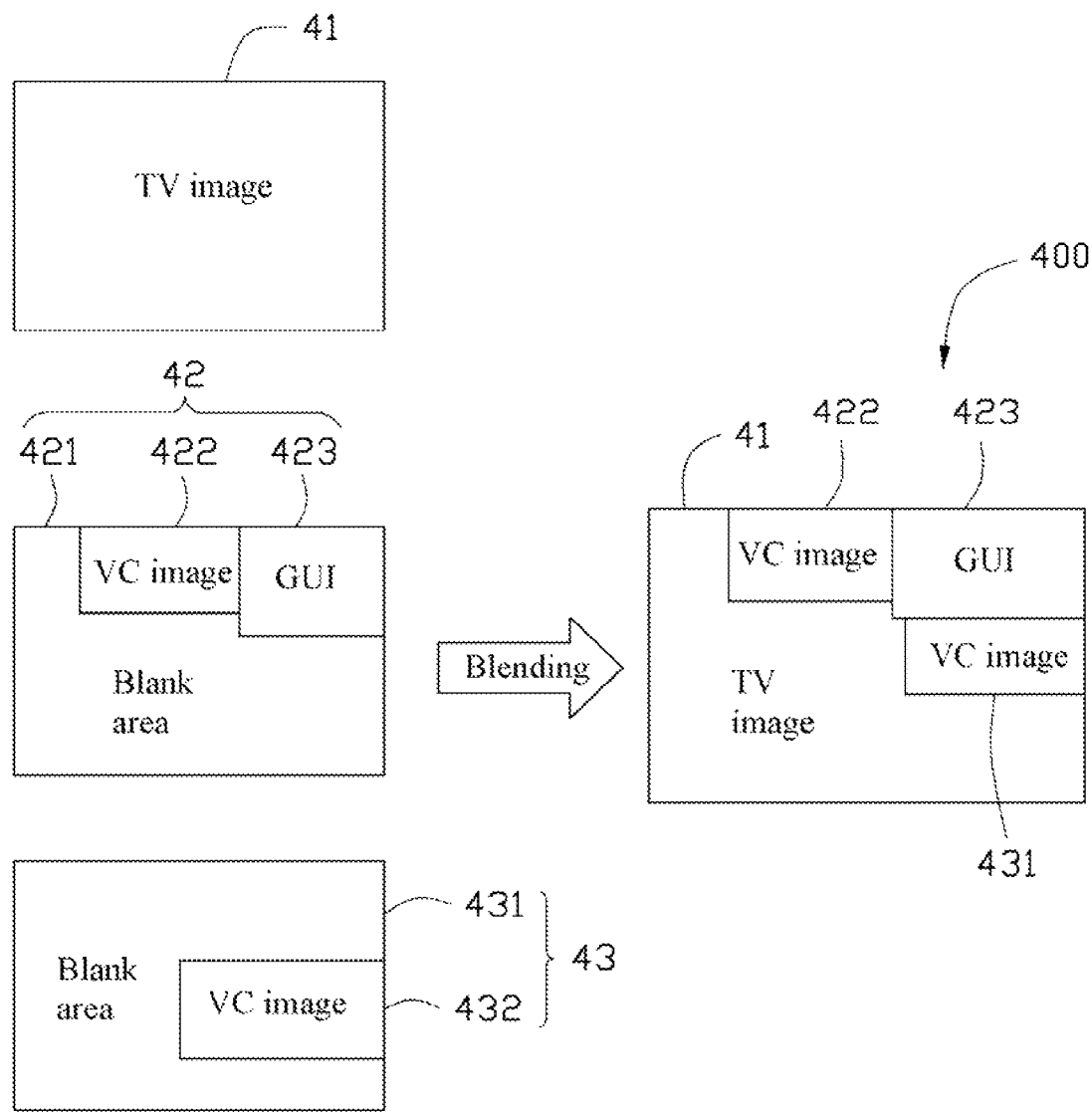
FIG. 8 is a schematic view of using the STB shown in FIG. 1 to simultaneously display typical TV images, VC images sent from the VC terminals shown in FIG. 1, and a GUI of the VC box shown in FIG. 1 on the TV shown in FIG. 1.

For example, referring to FIG. 8, the composition module 128 receives an image 41 coming from the TV decoder module 122a, an image 42 coming from the media stream capturing module 124 and the FUI management module 127, and an image 43 coming from the VC decoder module 122b, and blends these images together to form a multiple image 400 displayed on the TV 300. The image 41 is a typical TV image corresponding to the video and audio signals provided by the TV decoder module 122a. The image 42 includes a blank area 421, at least one VC image 422 corresponding to the video and audio signals provided by the media stream capturing module 124 (i.e., decoded by the decoder module 114), and a GUI 423 of the VC box 11. The image 43 includes a blank area 431 and at least one VC image 432 corresponding to the video and audio signals provided by the VC decoder module 122b. The image composition module 128 respectively fills the default chroma keys (e.g., transparent) of the VC box 11 and of the STB 12 into the blank area 421 and the blank area 431, such that the image 41 can expose through the blank areas 421 and 431. Furthermore, in the finally displayed multiple image 400, the VC images 421 and 431 overlap the image 41, and the GUI 423 overlaps the VC images 421 and 431, as above detailed.

The present disclosure enables the STB 12 to share data processing work of the VC box 11, thereby providing an auxiliary hardware resource for the VC box 11. In practice, the VC device 100 can support VCs with more participants than common VC devices. Furthermore, the STB 12 can be used to provide common TV signals to TVs (e.g., the TV 300) at the same time as processing VC media streams. This enables the TVs to be used to monitor the VC during the time that the VC device 100 broadcasts the common TV signals.

It is to be further understood that even though numerous characteristics and advantages of the present embodiments have been set forth in the foregoing description, together with details of the structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A video conference (VC) device for communicating with a plurality of VC terminals, comprising:
    a VC box, the VC box including a VC controller module, a media stream receiver module, and a decoder module, the VC controller module including a remote user interface (RUI) client; and
    a set-top box (STB) electrically connected to the VC box, the STB including a VC agent module connected to the VC controller module and a graphical user interface (GUI) management module connected to the VC agent module; the VC agent module further including a RUI server and a VC-GUI agent;
    wherein when a session is established between one of the VC terminals and the VC box, the VC controller detects if the decoder module is available; when the decoder module is available, the VC controller controls the media stream receiver module to receive a media stream sent from the VC terminal and transmit the media stream to the decoder module, and the decoder module processes the media stream to generate corresponding video and audio signals for the session; and when the decoder module is unavailable, the VC controller module controls the media stream receiver module to receive the media stream sent from the VC terminal and transmit the media stream to the STB, and the STB processes the media stream to generate corresponding video and audio signals for the session, the RUI client transmits a GUI data of the VC box to the GUI management module through the RUI server, the VC controller module registers windows of displaying the GUI data and images corresponding to the media stream processed by the STB in the GUI management module through the VC-GUI agent, the VC-GUI agent detects display positions of the windows on display devices through the GUI management module.

2. The VC device of claim 1, wherein the VC box further includes a discovery module for identifying type parameters and working parameters of the STB and thereby ensuring that the STB has at least one available decoder for processing the media stream sent from the VC terminal.

3. The VC device of claim 2, wherein the VC controller module generates a stream forward table corresponding to the media stream and sends the stream forward table to the media stream receiver module to inform the media stream receiver module if the decoder module is available.

4. The VC device of claim 3, wherein when the decoder module is available, the VC controller module sends the stream forward table unfilled with any information to the media stream receiver module, and the media stream receiver module identifies that the decoder module is available and transmits the media stream to the decoder module to be processed; and when the decoder module is unavailable and the STB is available, the VC controller module fills transmission information corresponding to the media stream into the stream forward table and sends the stream forward table filled with the transmission information to the media stream receiver module, and the media stream receiver module identifies that the decoder module is unavailable and transmits the media stream to the STB to be processed.

5. The VC device of claim 4, wherein when a plurality of media streams are sent to the VC box from the VC terminals and both the decoder module and the STB are available, the VC controller module selects either the decoder module or the STB to process each of the media streams by means of maintaining the stream forward table of the media stream to be blank or filling the stream forward table of the media stream with corresponding transmission information, and thus controls the media stream receiver module to transmit some of the media streams to the decoder module and other of the media streams to the STB to be processed.

6. The VC device of claim 1, wherein the STB is electrically connected to a television (TV), and transmits the video and audio signals corresponding to the media streams sent from the VC terminals generated by both the decoder module and the STB to the TV for display, such that the VC using the VC device is monitored by a user of the TV.

7. The VC device of claim 6, wherein the STB further transmits the GUI data of the VC box to the TV for display.

8. A method for using a video conference (VC) device and communicating with a plurality of VC terminals to establish a VC, wherein the VC device comprises a VC box including a decoder module and a set-top box (STB) electrically connected to the VC box, the method comprising:
   identifying type parameters and working parameters to ensure that the STB has at least one available decoder for processing media streams sent from the VC terminals;
   when a session is established between one of the VC terminals and the VC box, detecting whether the decoder module is available or not;
   when the decoder module is available, using the decoder module to process the media stream to generate corresponding video and audio signals for the session; and
   when the decoder module is unavailable, transmitting the media stream to the STB and using the STB to process the media stream to generate corresponding video and audio signals for the session, transmitting a graphical user interface (GUI) data of the VC box to the GUI management module, registering windows of displaying the GUI data and images corresponding to the media stream, and detecting display positions of the windows on display devices.

9. The method of claim 8, further comprising:
   using a VC controller module of the VC box to generate a stream forward table corresponding to the media stream, and send the stream forward table to a media stream receiver of the VC box to inform the media stream receiver module if the decoder module is available.

10. The method of claim 9, wherein when the decoder module is available, the VC controller module sends the stream forward table unfilled with any information to the media stream receiver module, and the media stream receiver module identifies that the decoder module is available and transmits the media stream to the decoder module to be processed; when the decoder module is unavailable and the STB is available, the VC controller module fills transmission information corresponding to the media stream into the stream forward table and sends the stream forward table filled with the transmission information to the media stream receiver module, and the media stream receiver module identifies that the decoder module is unavailable and transmits the media stream to the STB to be processed.

11. The method of claim 9, further comprising:
   when a plurality of media streams are sent to the VC box from the VC terminals and both the decoder module and the STB are available, using the VC controller module to select either the decoder module or the STB to process each of the media streams by means of maintaining the stream forward table of the media stream to be blank or filling the stream forward table of the media stream with corresponding transmission information, and thus control the media stream receiver module to transmit some of the media streams to the decoder module and other of the media streams to the STB to be processed.

12. The method of claim 8, further comprising:
   connecting the STB to a television (TV); and
   transmitting the video and audio signals corresponding to the media streams sent from the VC terminals generated by both the decoder module and the STB to the TV for display, such that the VC using the VC device is monitored by a user of the TV.

13. The method of claim 12, further comprising:
   transmitting the GUI data of the VC box to the TV to display.

* * * * *